July 31, 1934.  R. E. WILSON  1,968,432
CONNECTER
Filed Jan. 6, 1933
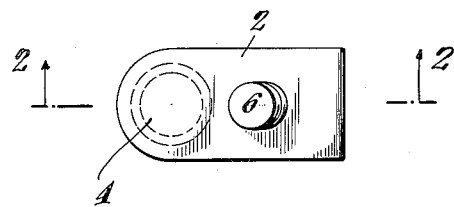
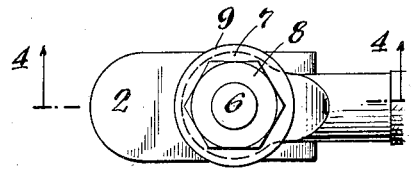
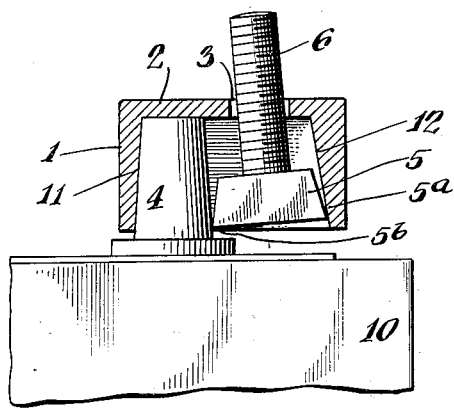
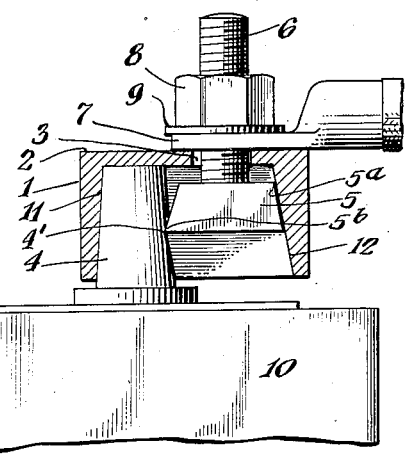
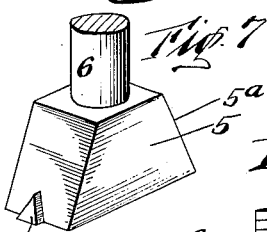
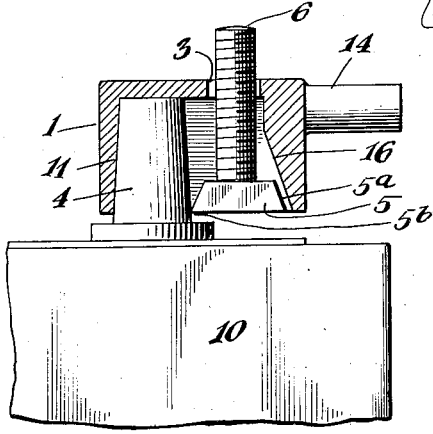
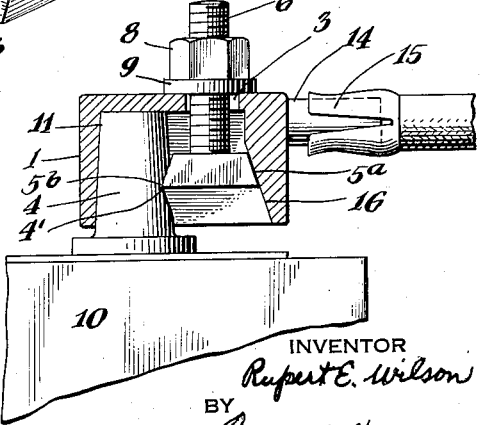
INVENTOR
Rupert E. Wilson
BY
Frank H. Harmon
ATTORNEY Patented July 31, 1934

1,968,432

UNITED STATES PATENT OFFICE 1,968,432

CONNECTER

Rupert E. Wilson, Oklahoma City, Okla.

Application January 6, 1933, Serial No. 650,445

6 Claims. (Cl. 173—259)

This invention relates in general to connecter devices, and more particularly to a connecter for storage battery terminals.

An object of this invention is to provide a connecter which is interchangeable, so as to be used on battery posts of different sizes and to include wedging elements which will insure an effective connection to any size battery post within certain limits.

Another object of the invention is to so construct the connecter that it will be possible to use such material as hardened lead so as to obtain the benefit of its noncorroding characteristics and at the same time produce a connecter which will be rugged and substantially permanent in form, in that it will not be necessary to bend it in any way to achieve a proper connection.

A further object of the invention is to provide such a connecter that will act also as a grease retainer so that the post and the wedge and its adjustable bolt, which latter is in contact with the cable, will be completely immersed in grease to prevent corrosion, the grease being effectively sealed against leakage from the connecter device.

A still further object of the invention is to provide a connecter device having the characteristics above mentioned and which will also allow of limited angular motion of the wedge bolt, bring about a biting action of the wedge with the post so as to insure an efficient connection, and effectively guarantee against undesired angular movement of the wedging element during the tightening of the connecting elements.

With the foregoing and other objects in view, the invention consists in the combination of parts and in the details of construction hereinafter set forth in the following description and appended claims, certain embodiments thereof being illustrated in the accompanying drawing, in which:

Figure 1 is a top plan view of the connecter casing, showing the wedge bolt extending therethrough;

Figure 2 is a vertical section through the connecter casing, taken along line 2—2 of Figure 1, showing the position of the wedge and battery post prior to the tightening of the bolt;
Figure 3 is a view similar to Figure 1, showing the connecting wire applied to the connecter casing;

Figure 4 is a view similar to Figure 2, showing the wedge tightened against the battery post and showing the cable connected to the wedge bolt;

Figure 5 is a view similar to Figure 2, showing a modification of the device to the extent that the inner surface of the casing adjacent the wedge is only partially tapered Figure 6 is a view similar to Figure 4, showing the modified form of casing shown in Figure 5 together with the cable connected to a projection provided on the casing;

Figure 7 is a detailed showing in perspective of a modified form of wedge, including a sharp lug adapted to bite into the battery post.

Referring more particularly to the drawing, the connecter casing 1 is preferably formed with three side walls, an open bottom and a top 2 which is closed with the exception of an elliptical slot 3 so as to form a substantially open box-like construction. The portion adapted to surround the battery post 4 is of substantially circular cross-section, while the portion adapted to house the wedge 5 is of substantially rectangular cross-section, so as to loosely receive the wedge and prevent its rotation during the tightening process.

The wedge is provided with an integral screw-threaded bolt 6 which extends upwardly through the aperture 3 and is adapted to receive the end of a cable connecter 7 and a tightening nut 8 which may obviously have arranged therebetween a suitable washer 9. The storage battery is generally indicated at 10 and the battery post 4, while shown as tapered may be of any suitable construction so as to be received by the casing.

In the modification shown in Figures 2 and 4 the side wall 11 may either be tapered or straight, as is found preferable, and the side wall 12 may be tapered, as shown in these two figures.

Figure 2 shows the connecter loosely placed over the battery post with the wedge and its bolt in position for tightening. It is to be noted that the elliptical slot 3 is of sufficient size to allow relative angular movement of the bolt as it is brought upwardly by applying the tightening nut.

Figure 4 shows the device in tightened position and also shows the bolt and wedge changed from their lower angular position to the upper vertical and tightened position. The bolt, during this process of tightening, has moved to the right-hand extremity of the slot and the beveled surface 5$^a$ of the wedge, in riding on the tapered surface 12 has caused the forward sharp edge 5$^b$ of the wedge to bite into the battery post 4 so as to actually cause an indentation in the latter, as shown a 4'. It is clear that there is so apt to be foreign matter of non-conducting characteristics which is so prevalent on terminals and connecters of this general character that it is found expedient to provide this wedging action which will dig through such foreign matter and into the battery post so as to partially mutilate the surface without causing any particular damage to the post. In this connection, Figure 7 shows a modification of the wedge, which may be provided with a sharp protruding lug form shown at 14, or any other suitable form for bringing about this biting action above referred to.

The modifications shown in Figures 5 and 6 illustrate the possibility of forming the casing with an integral projection 14 which may be either solid or hollow, so as to receive a suitable cable connecter, as shown in 15. These figures also disclose a modification of the tapered inner surface of the casing and it will be noted at 16 that this surface is only partially tapered as it is seldom, if ever, necessary for the wedge to be drawn up to the top of the casing.

Figures 5 and 6 illustrate the movement of the bolt and wedge during the tightening process in much the same manner as described in connection with Figures 2 and 4. It is possible, however, to provide the tapered surface 16, as shown in Figures 5 and 6, so that there will be a greater angle of taper, so that the bolt, prior to its tightening, may assume a vertical position, as indicated in Figure 5, and not make it necessary for any great degree of angular movement of the bolt during the tightening process as the wedge is brought upwardly.

In both of the modifications shown in Figures 2, 4 and 5, 6, and also regardless of which type of wedge is used, such as shown in these four figures, or one such as shown in Figure 7 with the biting lug, it has been found preferable to provide the casing with a liberal quantity of grease for the prevention of corrosion of the post and the electrical connecter. The grease may be packed in the casing either prior or after its placement over the battery post. This is because of the provision of the elongated elliptical slot 3 which also provides a means for inserting the grease in case this method of procedure is found preferable. The tightening of the bolt and the consequent raising of the wedge provides a snug engagement of the post, both with the wedge and with the inner surfaces of the casing. The wedge riding upwardly on either the tapered surface, as shown at 12 or 16, also provides an effective seal, and the wedge by its biting engagement into the surface of the post effectively seals the grease so that it immerses the corresponding surfaces of the battery post, wedge, wedge bolt, and interior surfaces of the connecter casing. The washer and nut when tightened provide a seal against the discharge of grease through the elliptical aperture 3.

It will be seen from the foregoing that there has been provided a connecter device which affords a means for interchangeability with various battery posts, an effective immersion of all of the essential electrical connection elements in grease so as to prevent corrosion therebetween, a wedging device which insures a biting contact into the battery post so as to overcome the possibility of non-conductivity which might otherwise be brought about by the existence of foreign material on the surfaces of the conducting elements, and which also provides a simple, inexpensive, rugged and efficient device which further makes it possible to use hardened lead or similar non-corroding metallic material and insure its long life, due to the fact that the device is inherently adjustable and therefore makes it unnecessary to mutilate it in order to effect an efficient connection.

I claim:

1. A battery terminal comprising a casing adapted to receive a battery post, a cable, a wedge member having a shank removably connected to said cable, said wedge being slidably fitted within said casing, said casing having an upper wall which is provided with an elongated slot to loosely receive the shank, lubricant in said casing and about the post, wedge and shank, and means for sealing the lubricant between the post, wedge and said upper wall, and for effecting an electrical connection between the conductor cable and the post, said means including a tightening member cooperating with the shank for forcing the wedge against the casing and effecting an engagement between the wedge and the adjacent surface of the post.

2. A battery terminal comprising a casing adapted to receive a battery post, a cable, a wedge member having a shank removably connected to said cable, said wedge being slidably fitted within said casing, said casing having an upper wall which is provided with an elongated slot to loosely receive the shank, lubricant in said casing and about the post, wedge and shank, and means for sealing the lubricant between the post, wedge and said upper wall, and for effecting a connection between the cable and the post, said means including a tightening member cooperating with the shank for forcing the wedge against the casing and effecting an engagement between the wedge and the adjacent surface of the post, and a mutilation of the latter by the former.

3. A battery terminal comprising a casing adapted to receive a battery post, a cable, a wedge member having a shank thereon and slidably fitted within said casing, said casing having an upper wall which is provided with an elongated slot to loosely receive the shank, said casing being provided with a beveled inner wall in opposed relation to the post, and lubricant arranged in the casing between the wedge post and upper wall and means for sealing the lubricant therein and for effecting a connection between the cable and the post, said means including a tightening member cooperating with said shank for drawing said wedge upwardly and by cooperation with said interior beveled edge cause an engagement between the wedge and the adjacent surface of the post and a mutilation of the latter by the former.

4. A battery terminal comprising a casing adapted to receive a battery post, a cable, a wedge member having a shank thereon and slidably fitted within said casing, said casing having an upper wall which is provided with an elongated slot to loosely receive the shank, said casing being provided with a beveled inner wall in opposed relation to the post, lubricant arranged in the casing between the wedge post and upper wall and means for sealing the lubricant therein and for effecting a connection between the cable and the post, said means including a tightening member cooperating with said shank for drawing said wedge upwardly and by cooperation with said interior beveled edge cause an engagement between the wedge and the adjacent surface of the post and a mutilation of the latter by the former, said shank being capable of angular as well as vertical movement in its adjustments by reason of its relationship with said elongated slot, and said wedge being so arranged within said body portion and said wedge and casing being of such shapes as to be incapable of relative rotary movement.

5. A battery terminal comprising a casing adapted to receive a battery post, a cable, a wedge member having a shank thereon and slidably fitted within said casing, said casing having an upper wall which is provided with an elongated slot to loosely receive the shank, said casing being provided with a beveled inner wall in opposed relation to the post, lubricant arranged in the casing between the wedge post and upper wall and means for sealing the lubricant therein and for effecting a connection between the cable and the post, said means including a tightening member cooperating with said shank for drawing said wedge upwardly and by cooperation with said interior beveled edge cause an engagement between the wedge and the adjacent surface of the post and a mutilation of the latter by the former, said shank being capable of angular as well as vertical movement in its adjustments by reason of its relationship with said elongated slot, and said wedge being so arranged within said body portion and said wedge and said casing being of such shapes as to be incapable of relative rotary movement, said wedge being provided with a sharp cutting lug arranged on its bevel surface adjacent said post for biting engagement therewith.

6. A battery terminal comprising a casing having an upper wall and adapted to receive a battery post and constituting a lubricant receptacle and a stationary wedge member, a movable wedge member having a shank integral therewith and extending through the upper wall of said casing in loose relation therewith, means including a tightening member cooperating with said shank for sealing the lubricant within the casing and about the post, wedge and shank and for bringing about an effective engagement between the movable wedge and the actual outer surface of the post.

RUPERT E. WILSON.